(12) United States Patent
Masayuki et al.

(10) Patent No.: US 6,368,222 B1
(45) Date of Patent: *Apr. 9, 2002

(54) UNIVERSAL JOINT AND PARALLEL MECHANISM MACHINE INCORPORATING THE UNIVERSAL JOINT

(75) Inventors: Nashiki Masayuki; Matsushita Tetsuya; Nakagawa Masao; Watanabe Shigeharu, all of Aichi (JP)

(73) Assignee: Okuma Corporation, Aichi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/410,861

(22) Filed: Oct. 1, 1999

(30) Foreign Application Priority Data

Oct. 19, 1998 (JP) .......................... 10-297006
Mar. 26, 1999 (JP) .......................... 11-084676

(51) Int. Cl.⁷ .................................. F16D 3/16
(52) U.S. Cl. ................. 464/113; 464/106; 464/147; 403/52
(58) Field of Search .............................. 464/105, 112, 464/113, 134, 147, 167, 168, 185, 905, 906; 403/52, 53, 55, 65, 66

(56) References Cited

U.S. PATENT DOCUMENTS

| | | | | |
|---|---|---|---|---|
| 1,899,170 A | * | 2/1933 | Wainwright | 464/905 |
| 2,617,277 A | * | 11/1952 | Sindelar | 464/904 |
| 3,789,625 A | * | 2/1974 | Rey | 464/112 |
| 3,965,700 A | * | 6/1976 | Nicoletti | 464/905 |
| 5,569,089 A | * | 10/1996 | Signorelli | 464/112 |

FOREIGN PATENT DOCUMENTS

WO          9217313          10/1992

* cited by examiner

*Primary Examiner*—Lynne H. Browne
*Assistant Examiner*—Aaron Dunwoody
(74) *Attorney, Agent, or Firm*—Pearson & Pearson, LLP

(57) ABSTRACT

A universal joint having two or three degrees of freedom in rotation is disclosed which exhibits a small size, great rigidity and satisfactory accuracy. An end of a first node is connected to a base through a rolling bearing. A plurality of circular-arc guide bearings are disposed at positions opposite to the center line of the first node opposite to the base. A circular-arc rail formed around a cylindrical base is engaged to the circular-arc guide bearings. A shaft is disposed in a direction of the diameter which passes through the center of the circular arc of the circular-arc rail of the cylindrical base. A second node is, through a rolling bearing, joined to the shaft such that the center of rotation is positioned on the axis of rotation of the base.

9 Claims, 9 Drawing Sheets

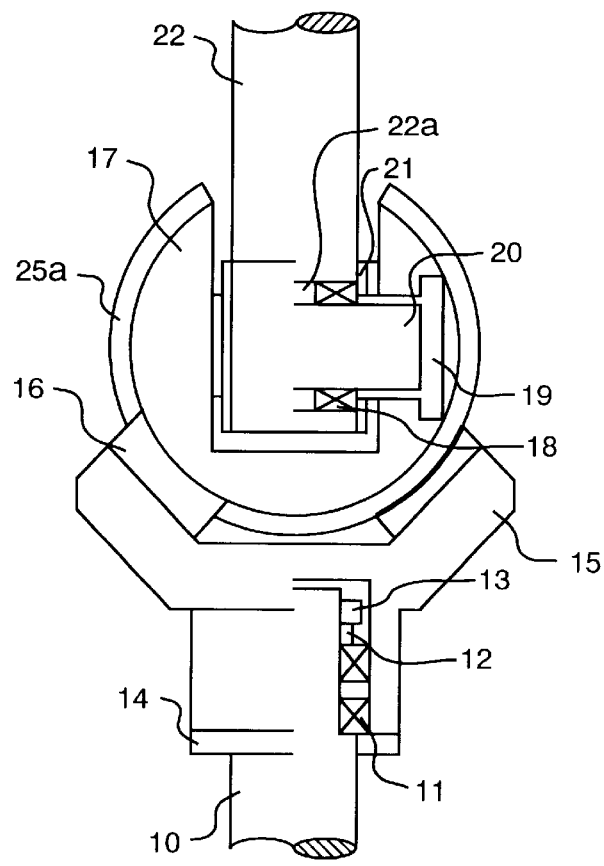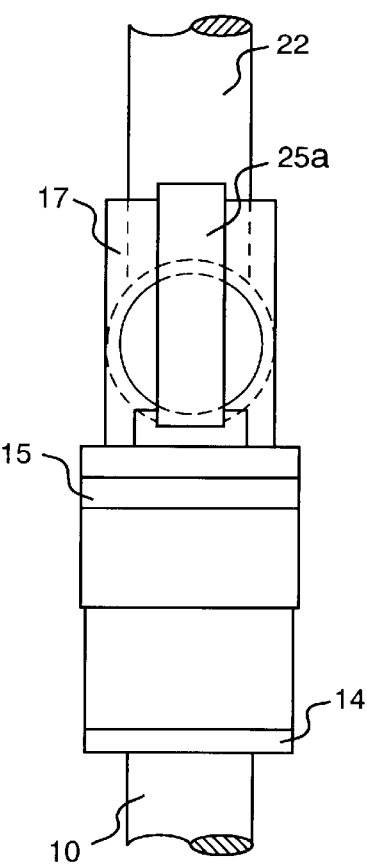
FIG. 1A
FIG. 1B

UNIVERSAL JOINT AND PARALLEL MECHANISM MACHINE INCORPORATING THE UNIVERSAL JOINT

BACKGROUND OF THE INVENTION

1. Field of the Invention

The present invention relates to a universal joint having two degrees of rotational freedom or three degrees of freedom in rotation and a parallel mechanism machine incorporating the universal joint.

2. Description of the Related Art

A spherical slide bearing and a rolling bearing are known as universal joint having three degrees of freedom in rotation. FIG. 7 is a diagram showing the structure of a spherical slide bearing which incorporates a node 1 having an end to which a semi-spherical socket 2 is joined. A sphere 4, to which a node 5 is joined, is fitted into the socket 2 such that separation of the sphere 4 is inhibited by a cover 3. Inclination of the sphere 4 in all directions within the socket 2 in a certain range is permitted. As a result, the spherical slide bearing serves as a universal joint having the three degrees of freedom in rotation.

As a similar spherical slide bearing, a bifurcated spherical slide bearing is known which incorporates either node thereof which is bifurcated. FIG. 8 is a diagram showing the structure of the bifurcated spherical slide bearing. Similarly to the spherical slide bearing, a node 1 is joined to a socket 2. A node 8 is joined to the left-hand semi-sphere 6, while a node 9 is joined to the right-hand semi-sphere 7. The two semi-spheres 6 and 7 are held by the socket 2 and a cover 3 similarly to the sphere 4 of the above-mentioned spherical slide bearing.

As a result of the foregoing structure, each of the two semi-spheres 6 and 7 is able to rotate perpendicularly to its plane and around an axis which passes through the center of the circle. Therefore, the semi-spheres 6 and 7 held in the socket 2 can be inclined in all directions.

As described above, the bifurcated spherical slide bearing is able to act as a universal joint having three degrees of freedom in rotation, similarly to the above-mentioned spherical slide bearing.

FIG. 6 shows a parallel mechanism machining tool incorporating a universal joint of the foregoing type. The parallel mechanism is a mechanism incorporating a plurality of links which connect a movable member and stationary members to one another. Thus, the parallel mechanism is able to control the position and the attitude of the movable member. A variety of machines, such as machining tools, industrial machines and robots, each incorporating the above-mentioned mechanism are in existence. Referring to FIG. 6, reference numerals 36 and 37 represent universal joints each of which is the universal joint shown in FIG. 7. The number of the universal joints 37 is the same as the number of the links (nodes) 38. Note that a structure is sometimes employed in which one universal joint 37, which is the universal joint shown in FIG. 8, is provided for two links (nodes) 38.

The above-mentioned universal joint which has a simple structure suffers from looseness, unsatisfactory accuracy and insufficient rigidity because the above-mentioned universal joint is the slide bearing. What is worse, there arises a problem in that heat is easily produced due to excessive friction. The structure of the foregoing universal joint that the spheres are secured encounters unsatisfactorily narrow movable range.

On the other hand, the rolling bearing is able to prevent looseness when a previous pressure is applied to the rolling bearing. As a result, the accuracy can be improved and the rigidity can be increased. Moreover, friction can be reduced and, therefore, the problem of production of heat can be prevented. Therefore, a universal joint structured as shown in FIG. 9 and having three degrees of freedom in rotation is known. The universal joint shown in FIG. 9 is constituted by combining three rolling bearings with one another as a substitute for the spherical slide bearing. The foregoing universal joint suffers from a problem of a narrow movable range and a necessity for a large size if required rigidity is obtained. In the structure shown in FIG. 9, the rolling bearing is disposed in a portion in which a node 1 and a U-shape base 40 are connected to each other, a portion in which the U-shape base 40 and a rectangular rotary frame 41 are connected to each other and portions in which the rotary frame 41 and two nodes 8 and 9 are connected to one another.

The parallel mechanism machine incorporating the universal joint shown in FIG. 7 or that shown in FIG. 8 is a slide bearing. Therefore, accuracy and rigidity required for the machine cannot be maintained. If an attempt is made that sufficient rigidity is maintained, the size of the joint must be enlarged. What is worse, inevitable excessive friction causes a problem to arise in that required durability cannot be obtained. Also the universal joint constituted by combining the rolling bearings each of which is shown in FIG. 9 encounters a problem of a narrow movable range which arises due to unsatisfactorily narrow movable range of the joint. Also the size of the joint is enlarged undesirably when satisfactory great rigidity is attempted to be maintained. If the size of the joint is enlarged, there arises a problem in that the original characteristic of the parallel mechanism machining tool that the movable member is a light member cannot be realized because the universal joint shown in FIG. 6 has the structure that the universal joint 37 is disposed adjacent to the movable member 39.

SUMMARY OF THE INVENTION

Accordingly, an object of the present invention is to provide a universal joint having two or three degrees of freedom in rotation and exhibiting a wide movable range, great rigidity, satisfactory accuracy and small size.

Another object of the present invention is to provide a parallel mechanism machine incorporating a universal joint exhibiting small size, great rigidity and a wide movable range.

To achieve the foregoing object, according to a first aspect of the present invention, there is provided a universal joint comprising: two bearing portions to permit rotation of the universal joint in two axial directions, wherein centers of rotation of the two bearing portions substantially coincide with each other, the bearing portions have axes of rotation which are substantially perpendicular to each other, and at least one of the two bearing portions is a circular-arc guide bearing.

According to a second aspect of the present invention, there is provided a universal joint comprising: three bearing portions to permit rotation of the universal joint in three directions, wherein two bearing portions in two axial direction of the three axial directions have centers of rotation which substantially coincide with each other, at least either of the two bearing portions is a circular-arc guide bearing, and the bearing portion in the residual axis of the three axes has an axis of rotation which passes through substantially the centers of rotations of the two axes and which is substantially perpendicular to the two axes.

According to a third aspect of the present invention, there is provided a universal joint having a structure according to the first aspect or the second aspect, further comprising a bifurcated link mechanism connected to the bearing portion or the circular-arc guide bearing and having centers of rotation which substantially coincide with each other.

According to a fourth aspect of the present invention, there is provided a universal joint having a structure according to the any one of first to third aspects, wherein the circular-arc guide bearing is a circular-arc rolling guide.

According to a fifth aspect of the present invention, there is provided a parallel mechanism machine comprising a universal joint according to any one of first to fourth aspects.

Other objects, features and advantages of the invention will be evident from the following detailed description of the preferred embodiments described in conjunction with the attached drawings.

BRIEF DESCRIPTION OF THE DRAWINGS

FIG. 1 shows a universal joint according to a first embodiment of the present invention, in which FIG. 1(a) is a front view and FIG. 1(b) is a side view;

FIG. 2 shows a second embodiment of the present invention, in which

FIG. 3 shows the circular-arc guide bearing shown in FIGS. 1 and 2, in which

FIG. 4 shows another embodiment of the circular-arc guide bearing, in which

FIG. 5 shows bifurcated universal joint having three degrees of freedom in rotation, in which

DESCRIPTION OF THE PREFERRED EMBODIMENTS

Figure 2A:
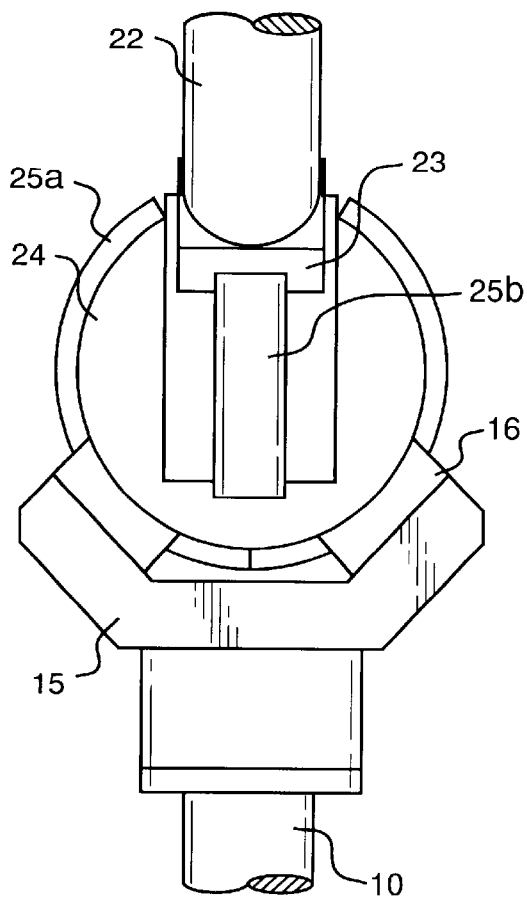
FIG. 2(a) is a front view and FIG. 2(b) is a side view.

Embodiments of the present invention will now be described with reference to the drawings.

FIG. 1 shows an embodiment of a universal joint according to the present invention. Referring to FIG. 1, reference numeral 10 represents a first node 10 which incorporates a rolling bearing 11 disposed at the leading end thereof; a collar 12 for adjusting the external pressure of the rolling bearing 11; and a nut 13 for securing an inner ring. The first node 10 is joined to a base 15 formed into a wedge shape facing side, the first node 10 being secured by a pressing cover 14 for securing an outer ring of the rolling bearing 11. Thus, the first node 10 is joined rotatively with respect to the base 15. That is, the base 15 is able to rotate around the central axis of the first node 10.

The base 15 incorporates a plurality of circular-arc guide bearings 16 formed on the upper surface opposite to the surface to which the first node 10 is joined. A circular-arc rail 25a disposed around a cylindrical base 17 formed into substantially a cylindrical shape is engaged to the circular-arc guide bearings 16.

As a result of employment of the above-mentioned structure, the circular-arc rail 25a slides in the circular-arc guide bearings 16. Thus, the cylindrical base 17 is able to rotate such that the center of the circular arc serves as the center of rotation. Hence it follows that the cylindrical base 17 is able to rotate in a plane which is perpendicular to the plane of rotation of the base 15. Note that the center of rotation of the cylindrical base 17 is made to be a position substantially on the axis of rotation of the base 15.

A second node 22 has a structure that an opening 22a is formed at an end of the second node 22, the opening 22a being formed in a direction perpendicular to the central axis of the second node 22. A rolling bearing 18 is inscribed in the opening 22a. Pressing covers 21 disposed at the two ends of the opening 22a secure the rolling bearing 18. A shaft 20 is inserted into the opening 22a. The two ends of the shaft 20 are secured to the cylindrical base 17 by a pressing member 19 such that the two ends are positioned at the center of rotation of the cylindrical base 17. Thus, the second node 22 is able to rotate with respect to the cylindrical base 17.

As described above, the axis of rotation of the rolling bearing 11, the center of circular arc of the circular-arc guide bearings 16 and the axis of rotation of the rolling bearing 18 are made to be perpendicular to one another at substantially one point. Moreover, the centers of rotation of the circular-arc guide bearings 16 and the rolling bearing 18 are made to substantially coincide with each other. As a result, a universal joint having three degrees of freedom in rotation can be realized which is operated similarly to the spherical slide bearing. As compared with a universal joint constituted by combining three rolling bearings, a wider movable range is permitted. Thus, the size can be reduced. If a previous pressure is applied to each of the bearings, rigidity can be increased and the accuracy can be improved.

As an alternative to the rolling bearing 11, a structure in which the first node 10 and the base 15 are directly connected to each other or integrally joined to each other may be employed. Another structure may be employed in which the second node 22 and the cylindrical base 17 are directly connected to each other or integrally joined to each other such that the rolling bearing 12 is not employed. Each of the foregoing structures realizes two axes of rotation, causing a universal joint having two degrees of freedom in rotation to be obtained.

Figure 2B:
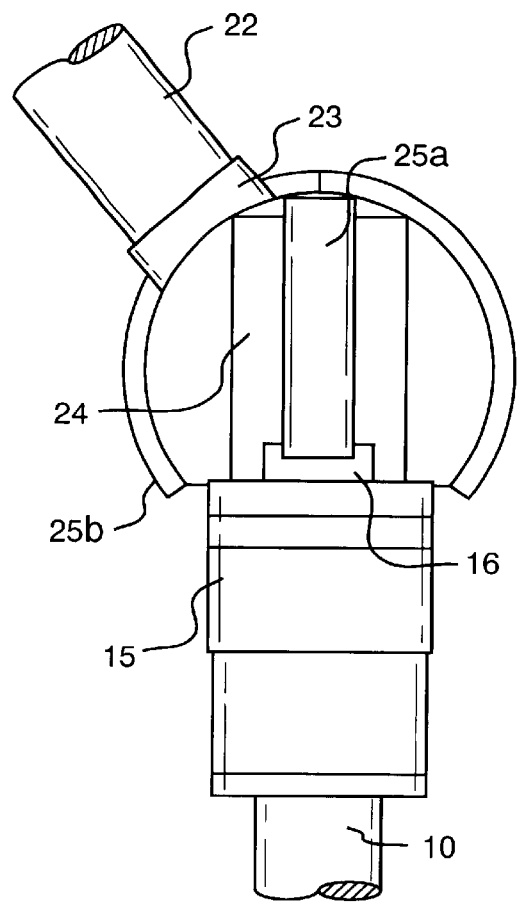

Two circular-arc guide bearings may be employed to realize a universal joint having three degrees of freedom in rotation as shown in FIG. 2. The universal joint shown in FIG. 2 incorporates a spherical base 24 having a cross shape cross section and employed as a substitute for the cylindrical base 17 shown in FIG. 1. The spherical base 24 has a second circular-arc rail 25b which is disposed perpendicularly to the circular-arc rail 25. The second circular-arc rail 25b is disposed in a longitudinal direction perpendicular to the cylindrical circular-arc rail 25a which is engaged to the circular-arc guide bearings 16 so as to be slid. A circular-arc guide bearing 23 is joined to the second circular-arc rail 25b. A second node 22 extends from the circular-arc guide bearing 23.

As a result of employment of the above-mentioned structure, the second node 22 is able to rotate such that the center of the circular arc of the circular-arc guide bearing 23 serves as the center of rotation. Also the spherical base 24 is able to rotate such that the center of the circular arc of the circular-arc guide bearings 16 which is substantially the same point as the center of the circular arc of the circular-arc guide bearing 23 serves as the center of rotation. As a result, a universal joint having three degrees of freedom in rotation can be realized.

If the first node 10 and the base 15 are directly connected to each other or integrated with each other without use of the rolling bearing which is disposed between the first node 10 and the base 15, two axes of rotation are realized. Thus, a universal joint having two degrees of freedom in rotation can be obtained.

Figure 3A:
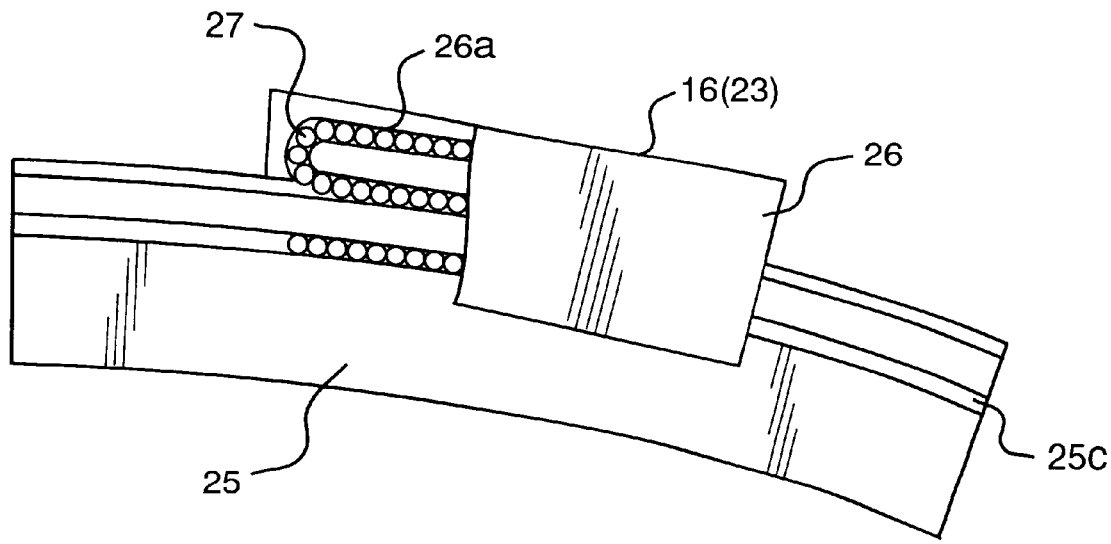
FIG. 3(a) is a side view and FIG. 3(b) is a cross sectional view.
Figure 3B:
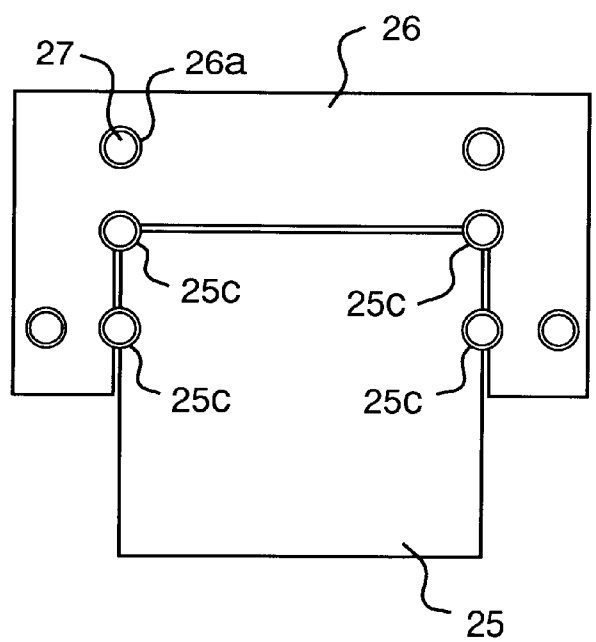

FIG. 3 is a diagram showing an example of the circular-arc guide bearings 16 and 23. As shown in FIG. 3, two longitudinal grooves 26a and two lateral grooves 26a are formed in a circular-arc block 26 having a U-shape cross sectional shape facing side. A plurality of balls 27 are inserted into the foregoing grooves 26a such that circulation of the balls 27 is permitted. Four grooves 25c are formed in a circular-arc rail 25 at positions corresponding to the grooves 26a. The balls 27 are guided by the circular-arc rail 25 so as to be circulated while the balls 27 are being rolled when the circular-arc block 26 is moved. That is, the circular-arc guide bearing 16 has a structure obtained by forming a direct-driven guide bearing into a circular arc. Since previous application of a pressure is permitted, looseness can be reduced, the accuracy can be improved and the rigidity can be increased.

Figure 4A:
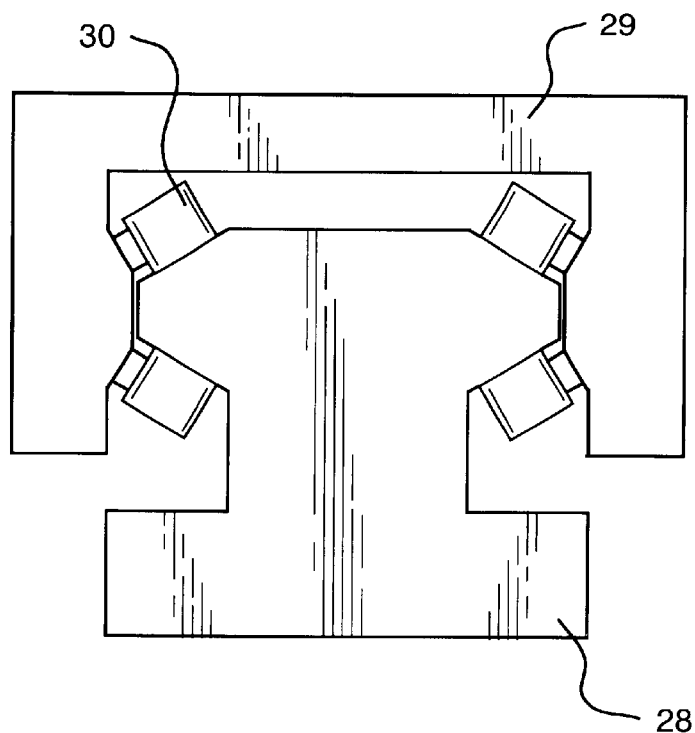
FIG. 4(a) shows a structure incorporating rollers and FIG. 4(b) shows a structure having a sliding structure.
Figure 4B:
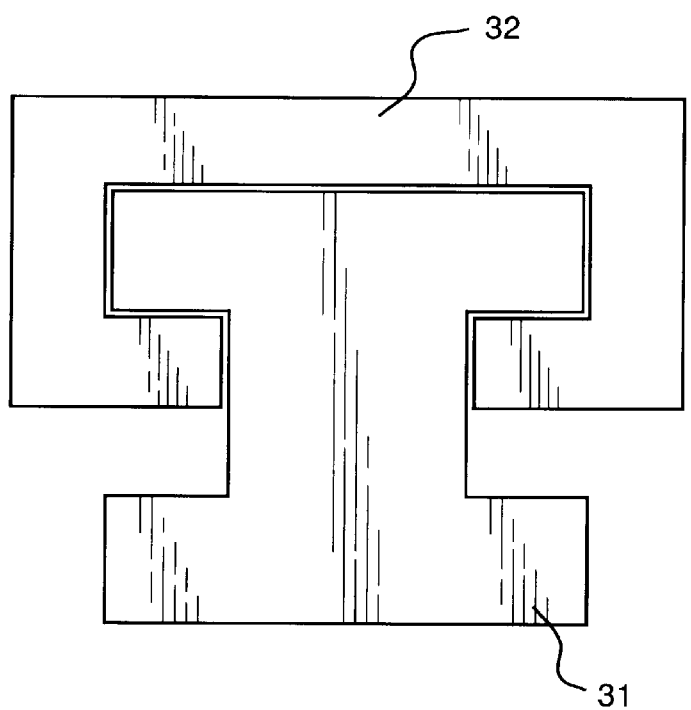

FIG. 4 shows another example of the circular-arc guide bearings 16. FIG. 4(*a*) shows a structure in which a plurality of rollers 30 are disposed on the inside of the circular-arc block 29 to guide the circular-arc rail 28. FIG. 4(*b*) shows an example of a structure in which sliding is used to guide the circular-arc rail. A circular-arc guide bearing having a simple structure from which the balls and rollers are omitted and using sliding may be constituted. Referring to the drawing, reference numeral 31 represents a circular-arc rail and 32 represents a circular-arc block. The foregoing structure using the slide guide has a problem in that excessive friction occurs which causes heat to easily be produced.

Figure 5A:
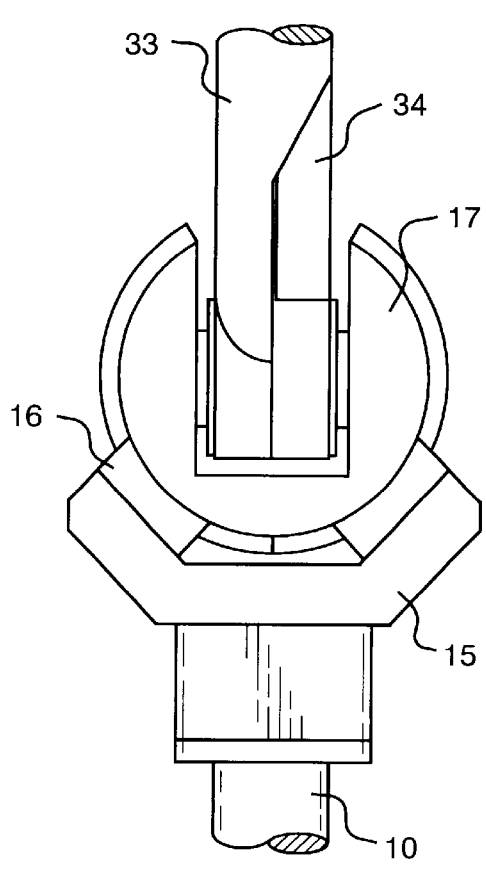
FIG. 5(a) is a front view and FIG. 5(b) is a side view.
Figure 5B:
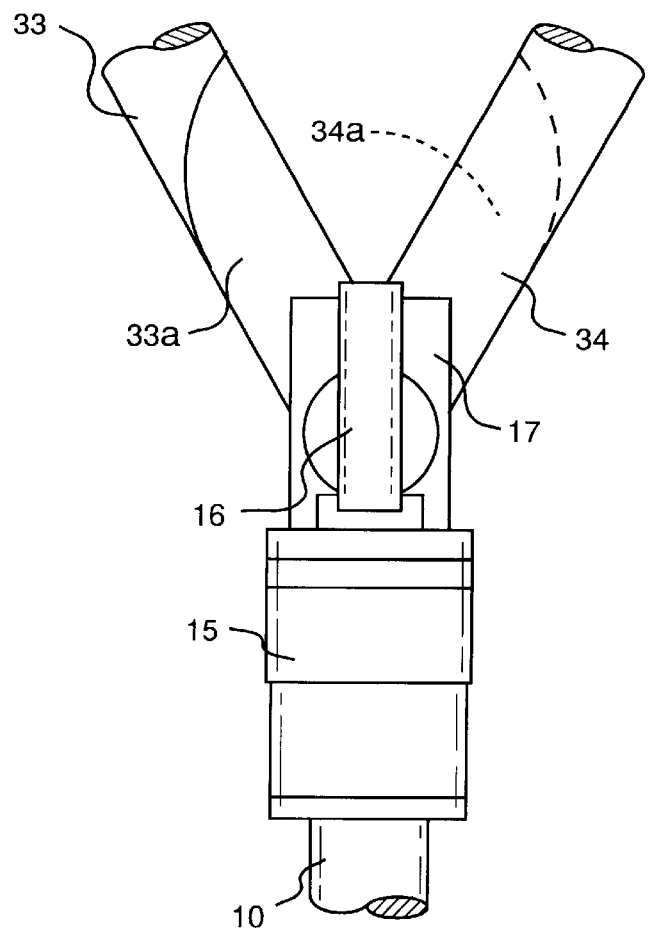

FIG. 5 shows an example of a universal joint incorporating two second nodes 22 each of which is shown in FIG. 2 to have a function similar to that of the bifurcated spherical slide bearing. Reference numerals 33 and 34 represent nodes obtained by dividing the node 22. The two nodes 33 and 34 are able to independently rotate. Since cut portions 33a and 34a are formed, overlap of the nodes 33 and 34 can easily be prevented. Thus, a wide movable range can be realized. In the foregoing case, rotation around the circular-arc guide bearing does not inhibit the movements of the two nodes. Therefore, a considerably large movable range can be realized.

Figure 6:
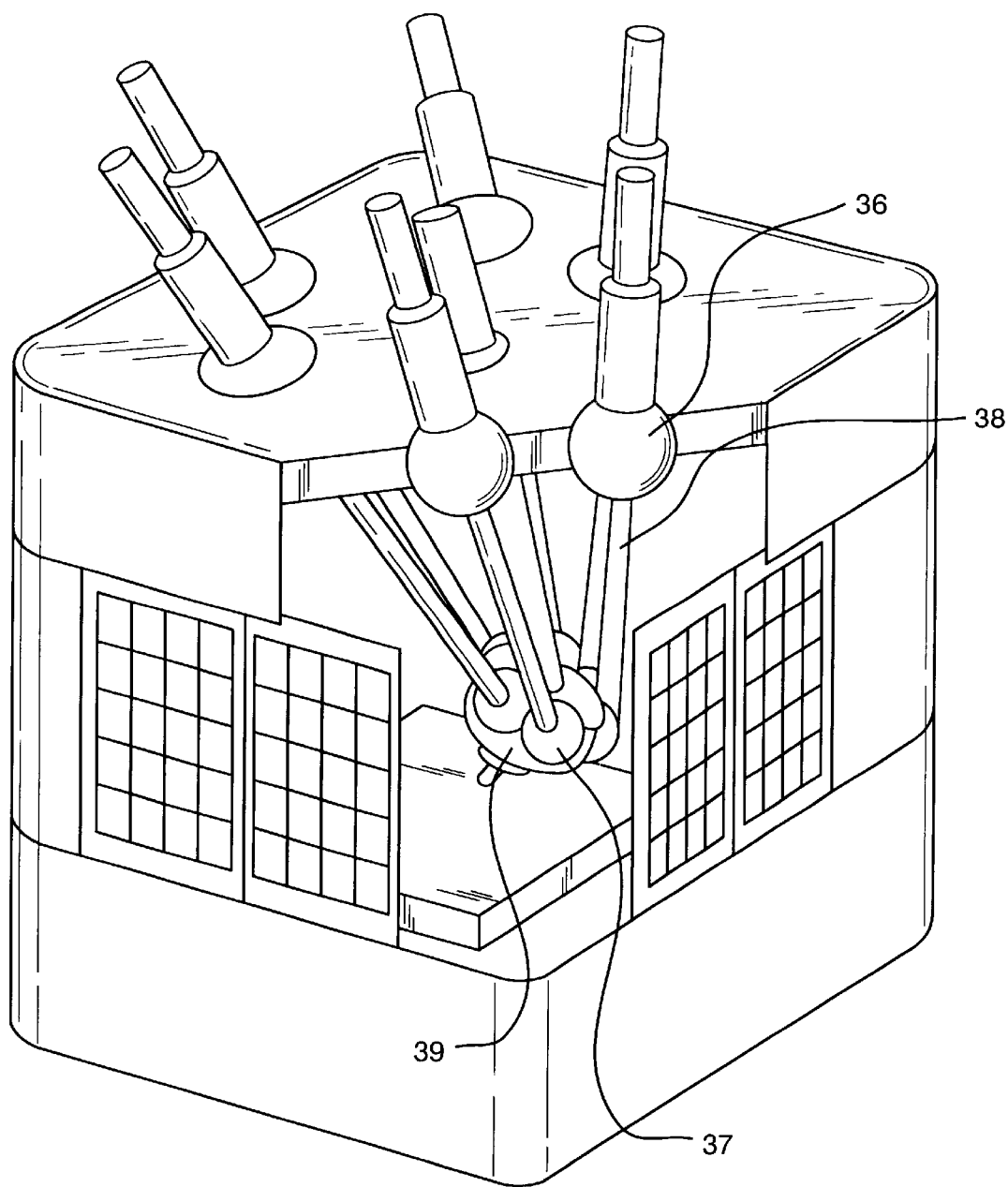
FIG. 6 is a perspective view showing the overall shape of a parallel mechanism machining tool.
Figure 7:
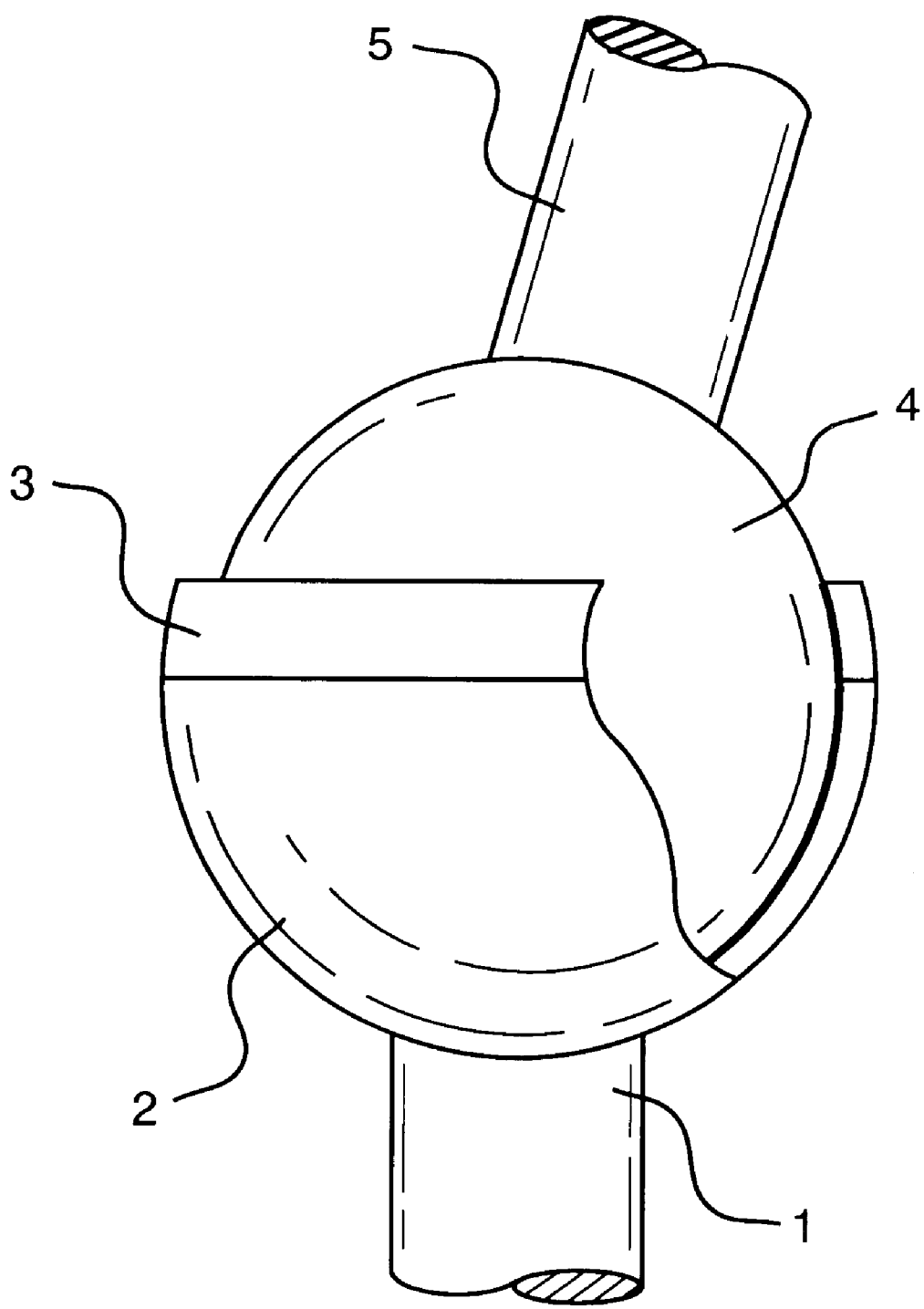
FIG. 7 is a front view showing a conventional universal joint incorporating a spherical slide bearing.
Figure 8:
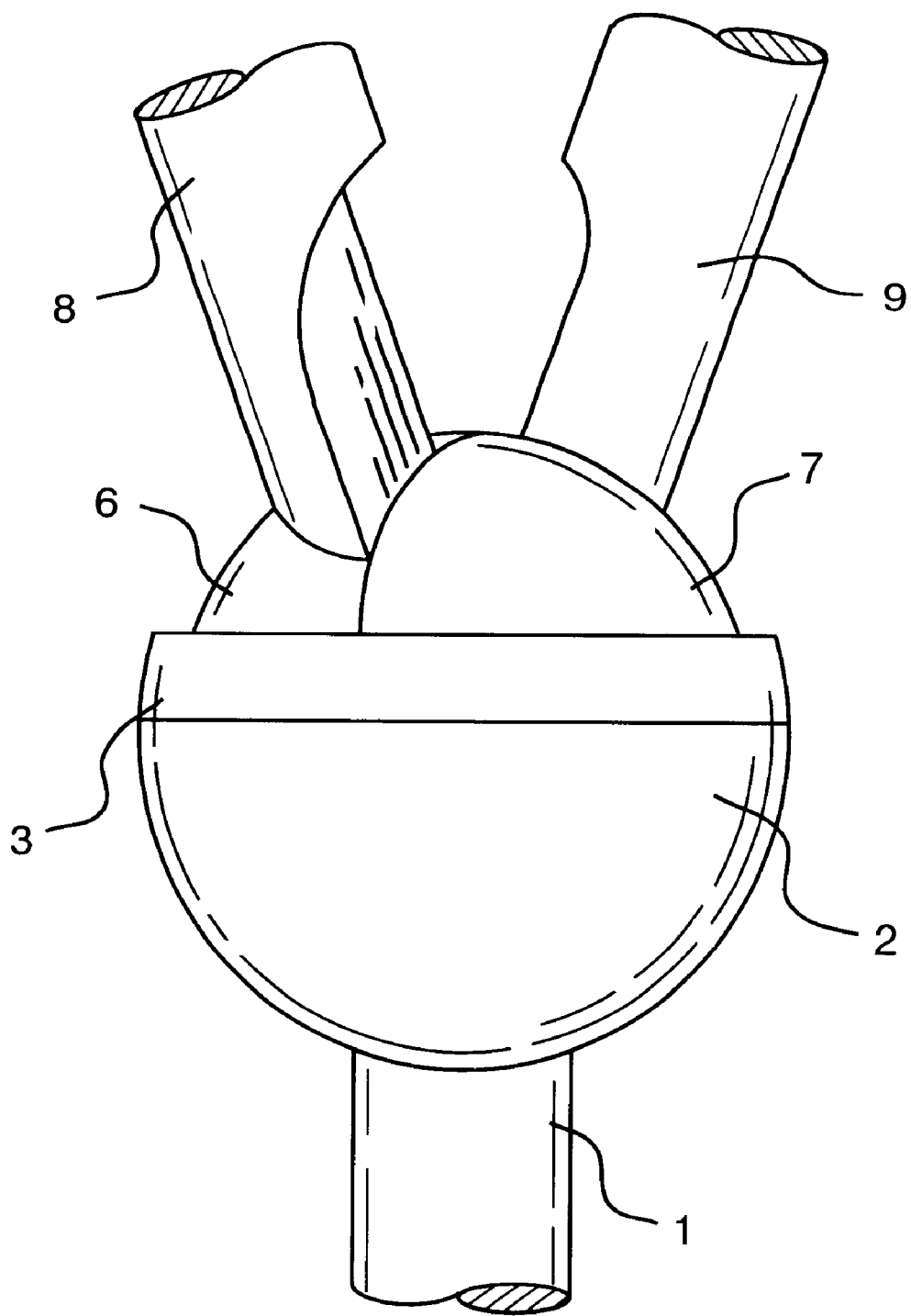
FIG. 8 is a front view showing a conventional universal joint incorporating a bifurcated spherical slide bearing.
Figure 9:
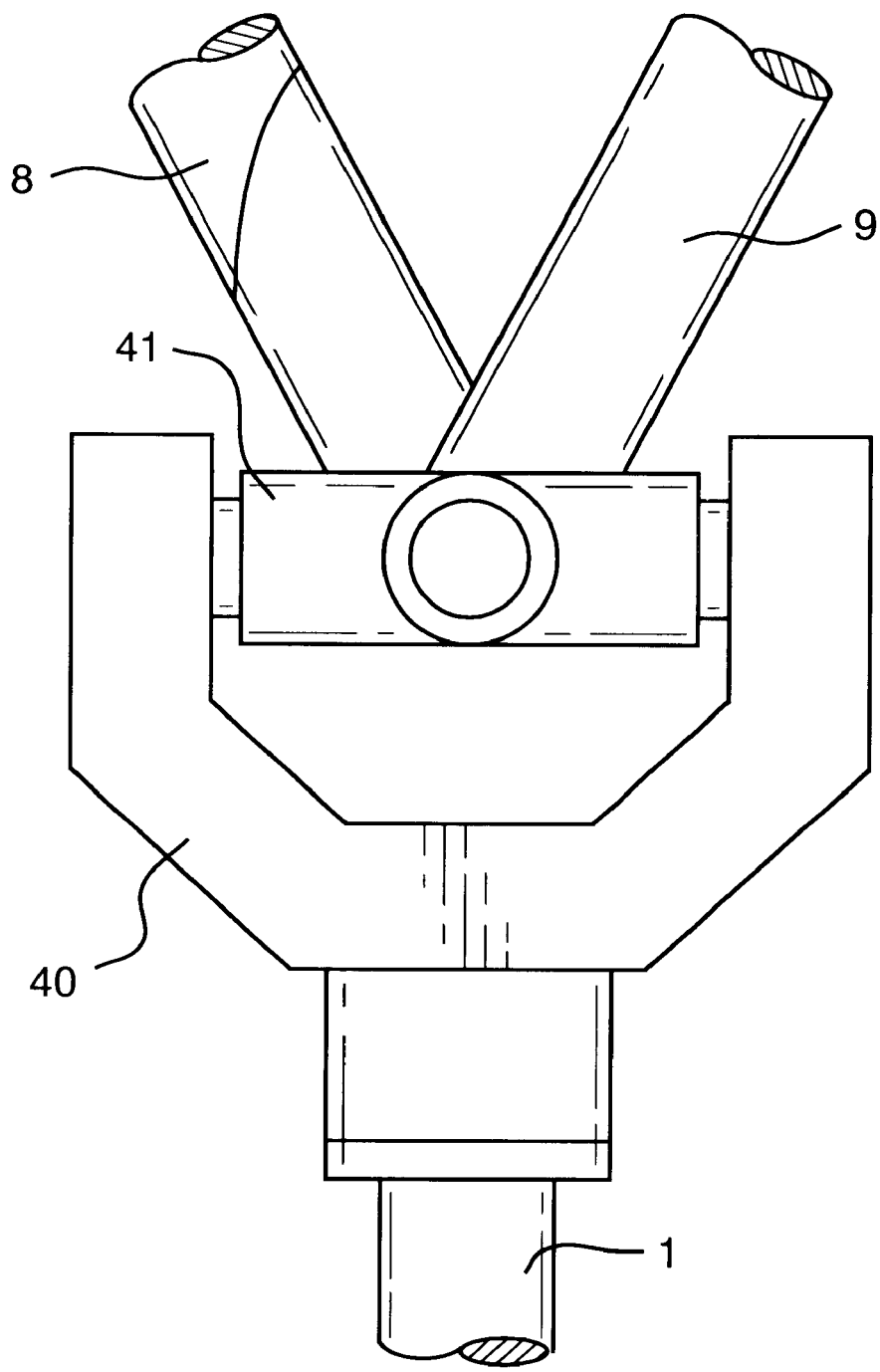
FIG. 9 is a front view showing a conventional universal joint which is a universal joint having three degrees of freedom in rotation and constituted by combining rolling bearings.

Also a parallel mechanism machining tool incorporating the above-mentioned universal joints is shown in FIG. 6. Joints 36 and 37 must have three degrees of freedom in rotation similarly to the spherical sliding bearing. Since the universal joint has a small size, great rigidity and considerably wide movable range, great rigidity sufficient for the machining tool can be obtained. Moreover, the weights of the moving members can sufficiently be reduced and the movable range can be enlarged. Therefore, a machining tool having great performance sufficiently exhibiting the characteristics of the parallel mechanism machining tool can be provided.

Although a so-called Stewart platform having six degrees of freedom is shown in FIG. 6 as an example of the parallel mechanism machine, the present invention is not limited to the foregoing example. The present invention includes a structure having two degrees of freedom and a structure having three degrees of freedom.

As described above, according to the first aspect of the present invention, the circular-arc guide bearings are employed and the two centers of rotation are made substantially coincide with each other. Therefore, a universal joint having two degrees of freedom in rotation and exhibiting a small size and a wide movable range can be obtained. When a previous pressure is applied to the bearings, looseness can be prevented and great rigidity and satisfactory accuracy can be realized.

According to the second aspect of the present invention, the circular-arc guide bearings are employed and the three axes of rotation are made to be perpendicular to one another at substantially one point. Moreover, the two centers of rotation are made substantially coincide with each other. Therefore, a universal joint having three degrees of freedom in rotation and exhibiting a small size and a wide movable range can be obtained. When a previous pressure is applied to the bearings, looseness can be prevented and great rigidity and satisfactory accuracy can be realized.

According to the third aspect of the present invention, a bifurcated link mechanism exhibiting a very large movable range in addition to the foregoing effects can be provided.

According to the fourth aspect of the present invention, the circular-arc guide bearing is the rolling guide bearing. Therefore, friction can be reduced and production of heat can be prevented.

According to the fifth aspect of the present invention, universal joints each having a small size, great rigidity and a wide movable range are employed. Therefore, satisfactory great rigidity required for the machine can be realized. Moreover, the weights of movable members can sufficiently be reduced. In addition, the movable range can be enlarged. As a result, a machining tool having great performance exhibiting the characteristics of the parallel mechanism machine can be provided.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A universal joint comprising:

only two bearing portions to permit rotation of said universal joint in two axial directions, wherein centers of rotation of said two bearing portions substantially coincide with each other, said bearing portions have axes of rotation which are substantially perpendicular to each other, and at least one of said two bearing portions is a circular-arc guide bearing.

2. A universal joint comprising:

three bearing portions to permit rotation of said universal joint in three directions, wherein two bearing portions in two axial direction of the three axial directions have centers of rotation which substantially coincide with each other, at least either of said two bearing portions is a circular-arc guide bearing, and the bearing portion in the residual axis of the three axes has an axis of rotation which passes through substantially the centers of rotations of said two axes and which is substantially perpendicular to the two axes.

3. A universal joint comprising:

two bearing portions to permit rotation of said universal joint in two axial directions, wherein:

centers of rotation of said two bearing portions substantially coincide with each other, said bearing portions have axes of rotation which are substantially perpendicular to each other, and at least one of said two bearing portions is a circular-arc guide bearing; and a bifurcated link mechanism connected to said bearing portion or said circular-arc guide bearing, having centers of rotation which substantially coincide with the centers of rotation of said bearing portion and said circuit-arc guide bearing.

4. A universal joint comprising:

two bearing portions to permit rotation of said universal joint in two axial directions, wherein:

centers of rotation of said two bearing portions substantially coincide with each other, said bearing portions have axes of rotation which are substantially perpendicular to each other, and at least one of said two bearing portions is a circular-arc guide bearing; and said circular-arc guide bearing is a circular-arc rolling guide.

5. A parallel mechanism machine comprising:

universal joints having two bearing portions to permit rotation of said universal joints in two axial directions, wherein centers of rotation of said two bearing portions substantially coincide with each other, said bearing portions have axes of rotation which are substantially perpendicular to each other, and at least one of said two bearing portions is a circular-arc guide bearing.

6. The universal joint according to claim 2, further comprising:

a bifurcated link mechanism connected to said bearing portion or said circular-arc guide bearing and having centers of rotation which substantially coincide with the centers of rotation of said bearing portion and said circular-arc guide bearing.

7. A universal joint according to claim 2, wherein said circular-arc guide bearing is a circular-arc rolling guide.

8. A universal joint according to claim 3, wherein said circular-arc guide bearing is a circular-arc rolling guide.

9. A parallel mechanism machine comprising:

a universal joint having three bearing portions to permit rotation of said universal joint in three directions, wherein two bearing portions in two axial directions of the three axial directions have centers of rotation which substantially coincide with each other and have axes of rotation which are substantially perpendicular to each other, at least one of said two bearing portions is a circular-arc guide bearing, and the bearing portion in the residual axis of the three axes has an axis of rotation which passes through substantially the centers of rotation of said two axes and which is substantially perpendicular to the two axes.

* * * * *